Aug. 15, 1939.        C. E. KERR        2,169,963
GREEN CORN CUTTING MACHINE
Filed Sept. 16, 1935
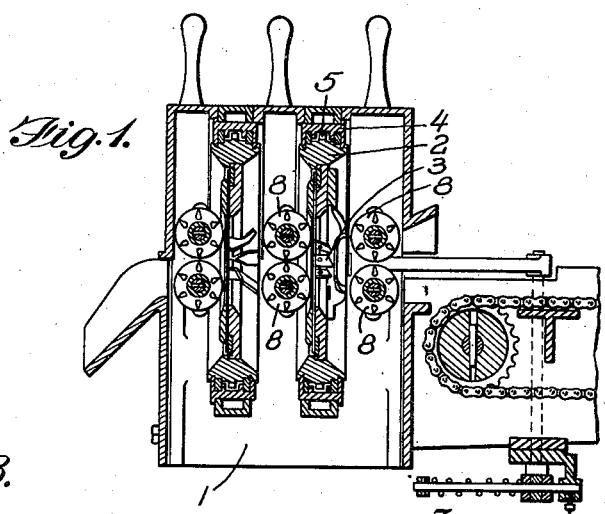
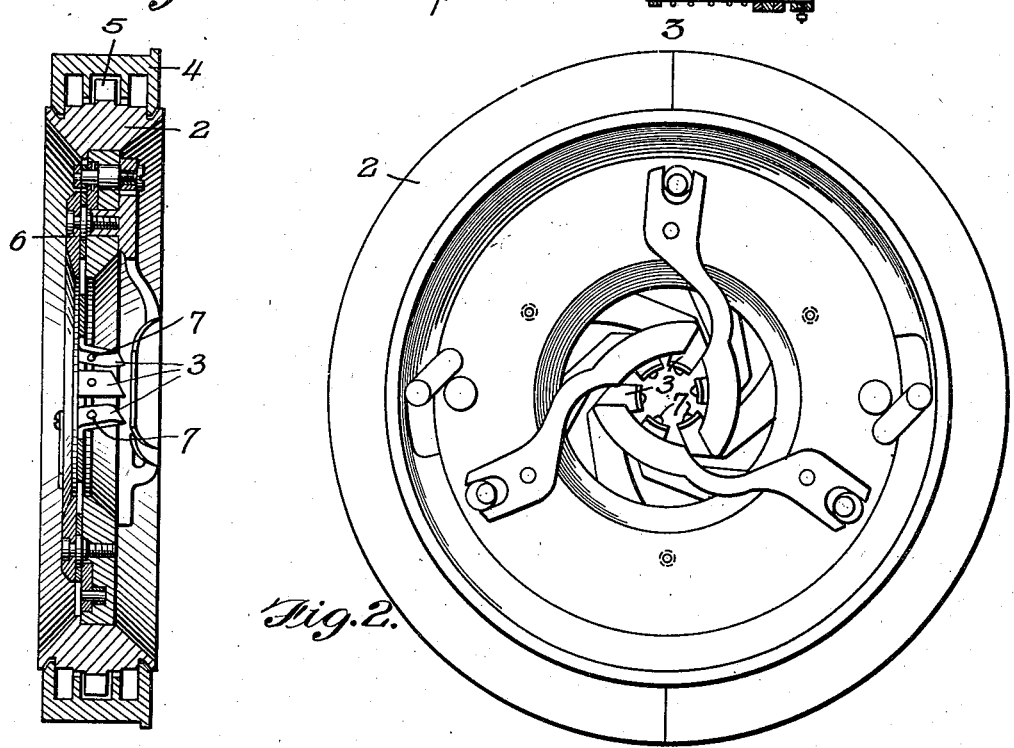
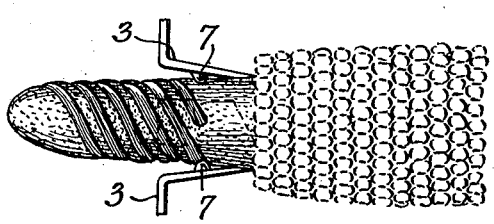
Inventor
Charles E. Kerr
By
Attorney Patented Aug. 15, 1939

2,169,963

UNITED STATES PATENT OFFICE 2,169,963

GREEN CORN CUTTING MACHINE

Charles E. Kerr, Hoopeston, Ill., assignor to Food Machinery Corporation, San Jose, Calif., a corporation of Delaware Application September 16, 1935, Serial No. 40,815

2 Claims. (Cl. 130—9)

This invention relates to improvements in rotary head green corn cutting machines and particularly to the control of the cutting blades that sever the kernels from the cobs.

In high speed corn cutting machines handling ears in random order just as they come from the field, some difficulty has been experienced in so controlling the cutting blades, as to depth of cut, to produce a cutting action that will sever the kernels as closely to the cobs as possible and still not cut so close as to remove chaff and portions of cob.

The ordinary gauge devices that operate in unison with the cutting blades and attempt to thereby control the depth of cut have been found quite efficient under most circumstances when they are kept in proper relative adjustment with the cutters, but it happens at times that inexperienced operators attempt to alter the relative adjustments between the cutters and depth of control gauges and fail to make proper adjustments and thereby throw the mechanism out of balance and proper cooperative action with the result that the kernels are more or less mutilated or portions of the cob and chaff are cut from the cob by the misaligned cutter and gauge.

It often happens also that due to the high rotative speeds imparted to the modern high speed corn cutters and the strains of operator incident thereto that the parts get out of alignment or that corn juices get into the coacting parts and harden more or less and interfere somewhat with proper action.

Applicant has improved the depth of cut gauging in green corn cutters by making the depth of control device and the kernel cutters integral so that no adjustment whatever is made or needed other than that given to the devices in the course of manufacture.

The great advantage gained by this procedure is that all kernels will be cut as close to the cob as is desired without removing chaff and parts of cobs, and this conduition prevails no matter what the length of kernels or the diameters of the ears and cobs, the depth control gauges operating consistently and accurately relative to the cutter and giving the same efficient results with all classes and kinds of corn.

Briefly the improvement consists in placing a small ball point just a short distance back of the cutting edge of the kernel cutters which will ride on the cob as the head rotates therearound and will prevent the cut edge from digging into the cob or cutting the kernels therefrom other than has been premeditated. This ball point also serves an additional purpose in providing an additional bearing or guide through which the ear passes and helps to hold it on a straight line of movement while passing from one feed device to the next in advance.

It is therefore an object of the invention to provide a depth of cut control device for green corn cutters that will be integral with the cutter.

It is a further object of the invention to provide a depth of cut control device that is formed integral with the cutters and is placed somewhat back of the kernel cutting edge so as to form an additional centering bearing for the cobs as they advance through the machine.

Reference now being had to the drawing a better and clearer understanding of the invention will be had.

Figure 1 represents a part of a modern high speed rotary head green corn cutter in vertical section showing the general relation of the parts constituting such a machine.

Figure 2 is an enlarged rotary head removed from the machine and shows clearly the kernel cutters and the ball points carried thereby on their inner surfaces.

Figure 3 is a vertical sectional elevation taken on substantially the line 3—3 of Figure 2 and shows very clearly the ball points located on the under surfaces of the cutters.

Figure 4 is somewhat of a diagrammatic view to show the action of the ball points on the cobs as the rotary head rotates therearound in the act of severing the kernels therefrom.

This last (Figure 4) is not intended to be more than just illustrative; is not necessarily drawn to scale nor does the representation of the spirals formed on the cob represent actual spirals as formed in operation.

Figs. 1, 2 and 3 have been taken from a copending application on a rotary corn cutter filed by John Schmidt under date of September 30, 1932 and bearing Serial No. 635,679, since issued into Patent 2,034,993, March 24, 1936, and are used in this application merely as illustrative of the application of this invention to a commercial green corn cutter.

The structure of these Figs. 1, 2 and 3 form no part of this invention and will not be claimed herein except as they may form combinations with the invention disclosed in this application.

Briefly describing the type of machine to which this invention is particularly applicable, the numeral 1 indicates a casing or housing in which the rotary heads are mounted and rotate. 2 represents a rotary cutter head carrying the cutter blades 3 which are mounted to open and close iris-like as the heads rotate and ears of green corn are fed therethrough.

The rotary head 2 is mounted for rotation in suitable bearings 4 and are driven by a ring gear 5 integral with the head 2; the driving means are not shown.

The cutters 3 are all mounted on a plate member 6 that is carried by the head 2 and which has rotary movement thereon through the centrifugal action set up in the cutter elements during rotation which causes them to all move iris-like in unison so that the circular opening formed by the expanding cutters will be constantly central with the center of rotation and will expand according to the size of the cob passing therethrough, the cutters being held by a concealed spring from opening larger than the smallest ear that will be passed therethrough so that each ear will increase the iris opening to accommodate that particular cob.

This invention as applied to a commercial green corn cutter resides in the ball points 7 formed integral with the under sides of the cutters 3 and projecting just sufficient to contact with the cob as soon as the cutters have started to cut the kernels therefrom.

On account of the high rotative speed imparted to the heads carrying the cutters and the axial movement imparted to the ears to pass them through the cutter heads, by the feed devices 8, the ball points 7 will track around the cob in spiral path as illustrated by Fig. 4, but as mentioned before the spiral paths illustrated are not necessarily accurate as to actual operation but are merely illustrative of what takes place.

The point angle of the cutter 3 relative to the cob and the projection of the ball points 7 are so related that both will contact with the cob in the desired relation to cut the kernels as closely to the cobs as possible without removing the chaff or pieces of cob and as soon as they have started a cut along a cob their relation and operation of severing the kernels therefrom will remain constant during the entire travel along the cob until all of the kernels have been removed.

The ball points 7 may be placed nearer or farther from the cut edges of the cutters or they may be made longer than shown, the only desideratum being that they be ball or other similarly shaped points so they will track around the cob in a spiral path.

Throughout the foregoin description reference has been made to the use of this improved kernel cutter as applied to rotary head corn cutters, but applicant wishes to point out that it is also applicable to any kind and nature of green corn cutter using gauges for controlling the depth of cut, it is also to be pointed out that this depth of cut control device may be used in conjunction with other gauging devices and especially where the cream style of corn is being produced. For cutting cream style corn the ordinary gauges that contact with the outside of the ear and ride over the tops of the kernels would be used to gauge the first cut and then the ball point device on the under side of the cutters would come ino play and gauge the depth of cut for the cutting of the rest of the kernel from the cob. It is important in the cutting of either style, the cream or whole grain, that the cut next to the cob is as close as is practical without actually cutting into the chaff and cob, and this improved device will accomplish this desired result perfectly.

What I claim as new and desire to secure by Letters Patent is:

1. A knife for cutting substantially whole kernels of green corn from the cob, comprising a shank having a knife blade projecting angularly therefrom, said blade being provided with a cutting edge, and a substantially knob-like protuberance on the underside of said blade disposed entirely between said cutting edge and said shank for engagement with the cob to gauge the depth of cut of said knife as the latter severs the kernels therefrom.

2. In a green corn cutter, rotative means carrying a yieldably mounted kernel cutting knife, means for feeding ears of corn to said knife to sever the kernels from said ears, said knife including a shank and a knife blade projecting angularly therefrom, said blade having a cutting edge, and a substantially knob-like protuberance on the under side of said blade disposed entirely between said cutting edge and said shank for engagement with the corn cob to gauge the depth of cut of said knife as the latter severs the kernels therefrom.

CHARLES E. KERR.